United States Patent [19]

Ciolkevich

[11] Patent Number: 4,755,253
[45] Date of Patent: Jul. 5, 1988

[54] SPLICING APPARATUS

[75] Inventor: John T. Ciolkevich, Richfield, Ohio

[73] Assignee: The Goodyear Tire & Rubber Company, Akron, Ohio

[21] Appl. No.: 60,413

[22] Filed: Jul. 27, 1987

Related U.S. Application Data

[62] Division of Ser. No. 862,310, May 12, 1986, Pat. No. 4,722,132.

[51] Int. Cl.$^4$ ............................................. B31F 5/00
[52] U.S. Cl. ..................................... 156/502; 29/451; 29/514; 100/237; 156/159; 156/262; 156/266; 156/413; 156/583.91
[58] Field of Search ............... 156/157, 159, 266, 262, 156/408, 421, 413, 474, 513, 502, 583.91; 29/6.2, 450, 451, 514, 520, 235; 72/375, 379, 385; 425/396, 369; 100/237

[56] References Cited

U.S. PATENT DOCUMENTS

| 1,970,780 | 8/1934 | Stevens | 154/10 |
|---|---|---|---|
| 2,201,470 | 5/1940 | Bostick | 154/10 |
| 2,409,571 | 10/1946 | Lequillon | 154/10 |
| 2,487,149 | 11/1949 | Leguillon | 156/513 |
| 2,614,952 | 10/1952 | Kraft | 156/413 |
| 2,658,551 | 11/1953 | Bender | 156/474 |
| 2,955,640 | 10/1960 | Barns | 154/9 |
| 2,995,177 | 8/1961 | Tolonen | 156/421 |
| 3,007,511 | 11/1961 | Barns et al. | 156/421 |
| 3,010,621 | 11/1961 | Bonarrigo | 156/474 |
| 3,013,930 | 12/1961 | Serbin | 428/57 |
| 3,152,942 | 10/1964 | Horton et al. | 156/421 |
| 3,340,719 | 9/1967 | Kandle et al. | 72/385 |
| 3,423,271 | 1/1969 | Kallert et al. | 156/513 |
| 3,748,889 | 7/1973 | Miller et al. | 72/385 |
| 3,758,355 | 9/1973 | Witherow | 156/513 |
| 3,788,933 | 1/1974 | Nauazawa | 156/157 |
| 3,794,542 | 2/1974 | Colombani et al. | 156/358 |
| 3,884,738 | 5/1975 | Hofius | 156/513 |
| 3,996,403 | 12/1976 | Gould et al. | 428/60 |
| 4,017,954 | 4/1977 | Grubb | 29/479 |
| 4,093,483 | 6/1978 | Jacobs | 156/474 |
| 4,109,503 | 8/1978 | Francon et al. | 72/379 |
| 4,199,394 | 4/1980 | Thompson | 156/474 |
| 4,501,356 | 2/1985 | Urban et al. | 428/57 |
| 4,502,315 | 3/1985 | Dubrousuy et al. | 72/379 |

FOREIGN PATENT DOCUMENTS

| 1579147 | 8/1965 | Fed. Rep. of Germany . | |
| 2074044 | 10/1971 | France . | |
| 1016201 | 5/1983 | U.S.S.R. | 156/408 |

Primary Examiner—Jerome Massie, IV
Assistant Examiner—David Herb
Attorney, Agent, or Firm—Frederick K. Lacher; T. P. Lewandowski

[57] ABSTRACT

An overlapping layer (24) of a first body of deformable material is pressed by an edge (78) of each of a plurality of blade members (42) into an overlapped layer (26) of a second body of resilient material forming slots (74) in the second body with ribs (88) of the first body displaced therein. The blade members (42) are removed while the ribs (88) are retained in the slots (74) and gripped by the surrounding resilient material. The blade members (42) may be adjustably clamped in a cartridge (40) which is removable from the splicing apparatus (10) for adjustment and replacement of the blade members (42) so that they conform to the surface profile (82) and splice interface line (80) of the bodies to be spliced.

10 Claims, 6 Drawing Sheets

SPLICING APPARATUS

This is a division of application Ser. No. 862,310 filed May 12, 1986, now U.S. Pat. No. 4,722,132 and relates generally, as indicated, to a method and apparatus for splicing low rolling resistance polymer compounds, or any compounds for which there is a low "tack" coefficient in the uncured state or where the use of an adhesive is prohibitive. This method and apparatus is especially desirable for splicing of tire treads.

Heretofore, tire tread compounds have had a high "tack" coefficient in the uncured state or an adhesive has been used so that the traditional tread splice stitchers, which press the tread ends together, have been used.

With the method and apparatus of this invention, there is provided a mechanical bond of the tread splice that does not rely on the "tackiness" of the tread material. The resilience of the tread material is utilized to grip ribs of a top layer displaced into slots of a lower layer formed by pressing edges of blade members against portions of the top layer into portions of the bottom layer and then holding the top layer against the bottom layer while the blade members are removed. With this construction, the blade members may be adjustably clamped in a cartridge which is removable for adjusting and replacing the blade members so that they conform to the surface profile and splice interface line of the upper and lower layers.

In accordance with one aspect of the invention there is provided a splicing method for attaching an overlapping upper layer of a first body of deformable material to an overlapped lower layer of a second body of resilient material by a plurality of spaced-apart blade members comprising:

(a) pressing an edge of each of the blade members against said upper layer of the first body and into the lower layer of the second body to form a slot in the second body and form a rib of the first body displaced into the slot;

(b) retracting the edge of each of the blade members from the rib and the slot; and (c) holding the first body against the second body during retraction of the edge of each of the blade members from the rib and the slot so that the rib is gripped in the slot by the resilient material of the second body surrounding the rib.

In accordance with another aspect of of the invention there is provided splicing apparatus for attaching an overlapping upper layer of a first body of deformable material and an overlapped lower layer of a second body of resilient material comprising:

(a) support means for supporting the overlapped lower layer of the second body;

(b) blade means at a spaced-apart position from the support means adjacent the overlapping upper layer of the first body;

(c) means for moving the blade means toward the support means to press an edge of each of the blade members through the upper layer of the first body and into the lower layer of the second body to form a slot in the second body and displace a rib of the first body into the slot;

(d) means for moving the blade means away from the support means to retract the blade members from the rib and the slot; and (e) means for holding the upper layer of the first body against the lower layer of the second body on the support means while retracting the blade members from the rib and the slot so that the rib is gripped in the slot by the resilient material of the second body.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
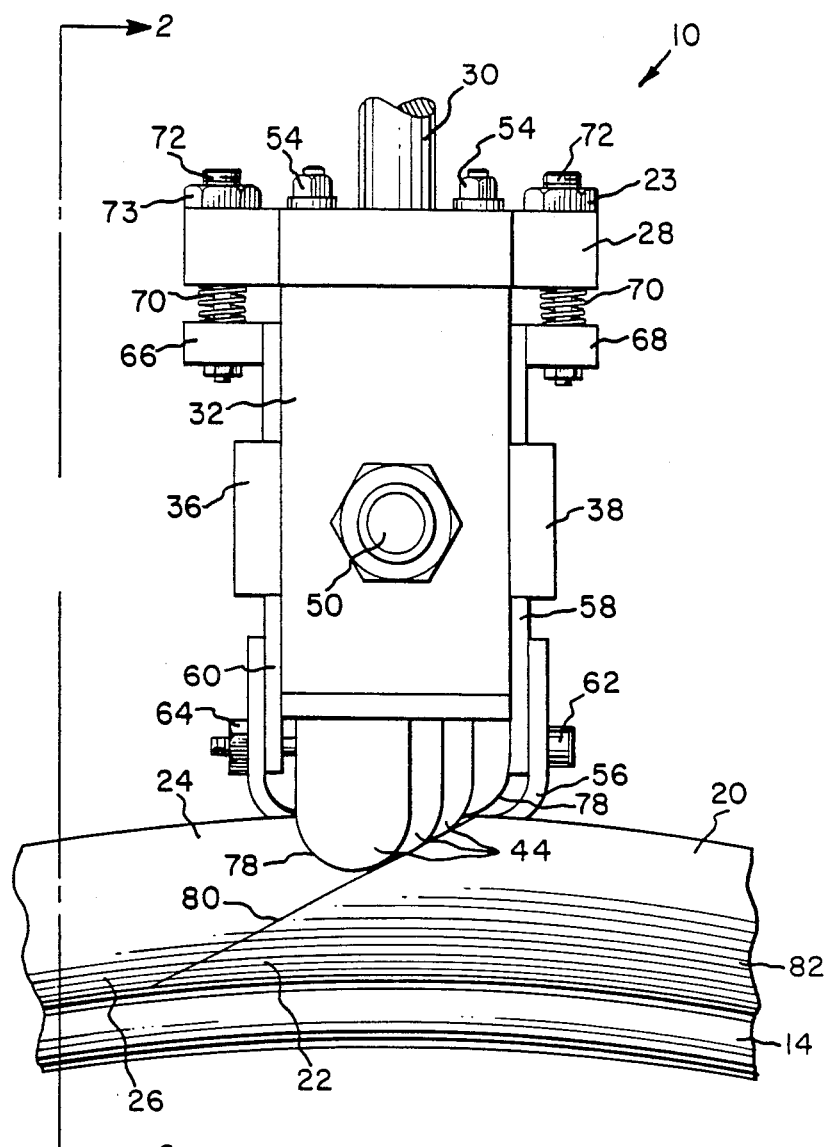
FIG. 1 is an end view of a tread splice stitcher apparatus embodying the invention taken along line 1—1 in FIG. 2, shown in position for splicing a tire tread on a tire casing supported on a tire building drum with parts being sectioned and broken away.
Figure 2:
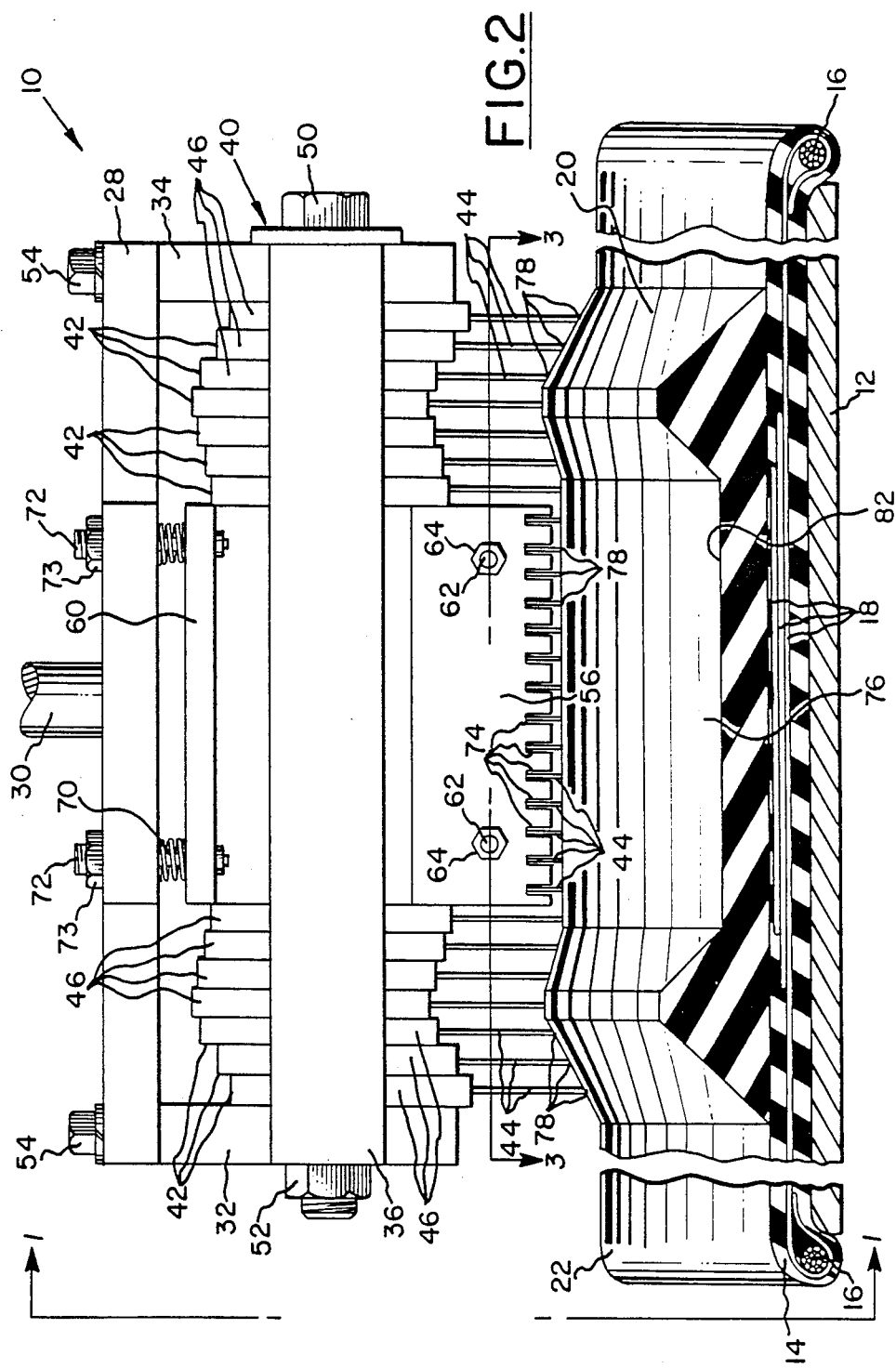
FIG. 2 is a front elevation taken along the line 2—2 in FIG. 1, with parts being broken away.
Figure 3:
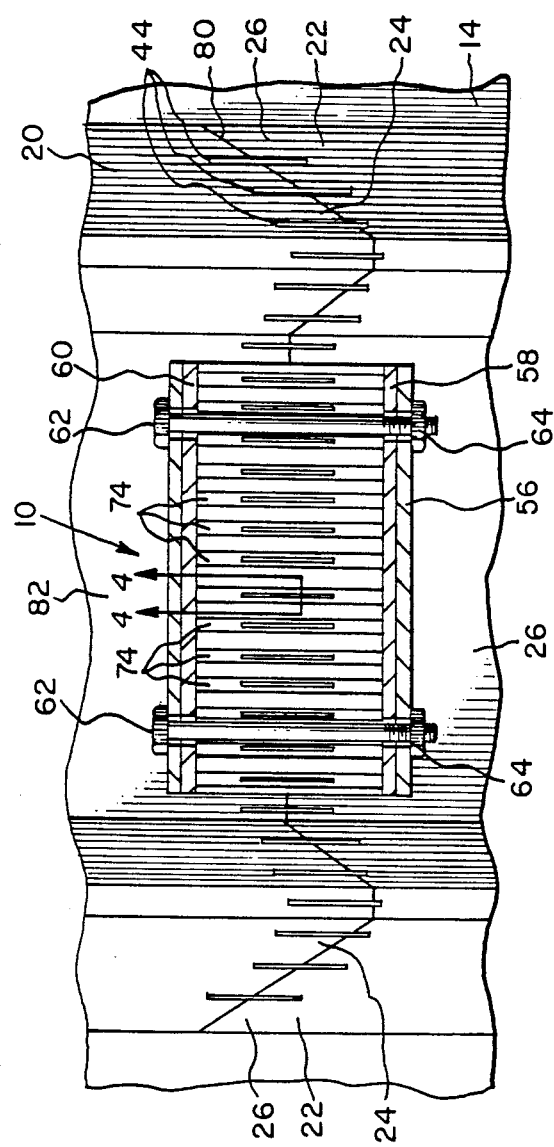
FIG. 3 is a plan view taken along the line 3—3 in FIG. 2 with parts being broken away.

Referring to FIGS. 1, 2 and 3, a splicing apparatus such as tread splice stitcher 10 is shown in operating position adjacent a cylindrical tire building drum 12 on which a tire casing 14 having beads 16 and lies 18 of reinforcing fabric has been built. A layer of tread stock 20 is wrapped around the tire casing 14 on the drum 12 and has a spliced portion 22 where an upper layer 24 of one end of the tread stock 20 is in overlapping relationship with a lower layer 26 at the other end of the tread stock. In this embodiment the stock 20 has been wound on a spool and is fed to a conveyor where it is cut to length by a tread cutter providing cut ends with surfaces at an angle other than 90 degrees to the surface of the tread stock so that the ends will be overlapping at the spliced portion 22 as shown in FIGS. 1 and 3. The tread stock 20 of this embodiment is a low rolling resistance polymer compound which has a low "tack" coefficient in the uncured state. This material is deformable and reslient but does not have enough tack to stick the upper layer 24 against the lower layer 26 even under pressure.

Figure 7:
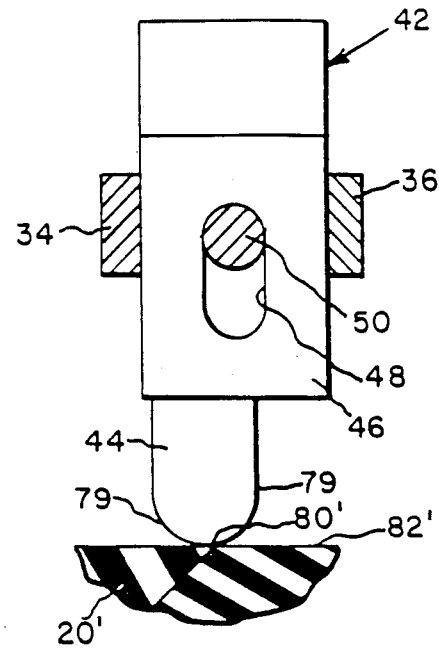
FIG. 7 is a sectional view taken along the line 7—7 in FIG. 6 showing one of the blade members in the adjusted and replaced condition.
Figure 8:
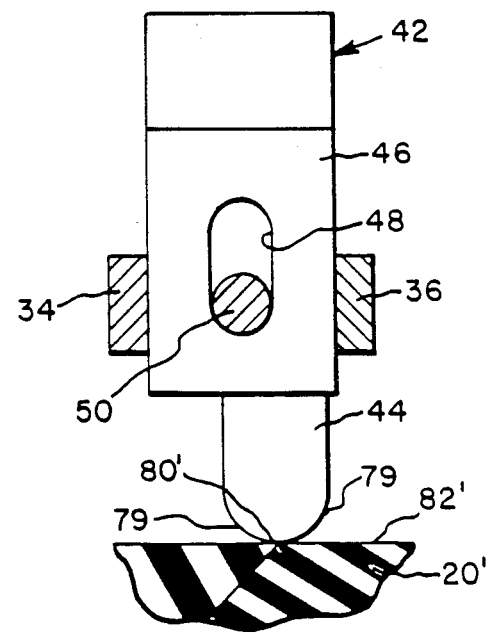
FIG. 8 is a view like FIG. 7 taken along the line 8—8 in FIG. 6 showing another one of the blade members.

The tread splice stitcher 10 has a mounting plate 28 which may be connected to a rod 30 connected to a piston of a piston and cylinder assembly or other actuating means for moving the mounting plate toward and away from the drum 12. End plates 32 and 34 are fastened to the mounting plate 28 at each end and connected by side plates 36 and 38 defining a splicing blade member cartridge 40 for containing a plurality of blade members 42 as shown in FIGS. 7 and 8. Each of the blade members 42 has a splicing blade 44 mounted in a blade holder 46. Each blade holder 46 has a slot 48 through which a clamping bolt 50 extends. The clamping bolt 50 is located in holes in the end plates 32 and 34 and has a nut 52 threaded on one end for clamping the blade members 42 in position between the end plates. The end plates 32 and 34 may be fastened to the mounting plate 28 by screws 54 so that the splicing blade member cartridge 40 may be removed from the mounting plate for adjustment and replacement of the blade members 42.

A holding means such as retaining plate 56 is located under the splicing blade member cartridge 40 and is fastened to side members 58 and 60 by bolts 62 and nuts 64 threaded on the bolts. The side members 58 and 60 extend from the retaining plate 56 between the side plates 36 and 38 of the splicing blade member cartridge 40 to flanges 66 and 68 spaced from the mounting plate 28. Resilient means such as compression springs 70 are interposed between the flanges 66, 68 and the mounting plate 28 for urging the retaining plate 56 against the upper layer 24 of the spliced portion 22. Bolts 72 extend through holes in the mounting plate 28 and flanges 66 and 68 as well as through the spring 70 interposed between the flanges and mounting plate for supporting the side members 58 and 60 and the retaining plate 56 while at the same time permitting sliding movement of the flanges on the bolts. Nuts 73 are threaded on the bolts 72 for supporting the side members 58 and 60 and the retaining plate 56. Other resilient means such as a piston and cylinder may be used instead of the spring 70, bolts 72 and nuts 73, if desired.

Referring to FIGS. 2 and 3, the retaining plate 56 has slots 74 through which at least some of the splicing blades 44 extend. The retaining plate 56 may have a length the same as the length of the splicing blade member cartridge 40; however, in this embodiment, the tread stock 20 has a profile such that the outer portions are raised and accordingly the retaining plate only has a length equal to the length of a flat portion 76 at the center of the tread stock member 20.

As shown in FIGS. 1, 2 and 3, the blade holders 46 are clamped between the end plates 32 and 34 so that the ends of the blades 44 touch the tread stock 20 and conform to the profile of the tread stock. Also, as shown in FIG. 3, the splicing blades 44 are positioned so that an edge 78 of each of the splicing blades 44 extends over a splice interface line 80 at a surface 82 of the tread stock 20. The edge 78 of the blade 44 is preferably curved at the sides 79 to prevent cutting of the tread stock 20 and reduce the force necessary to penetrate the tread stock.

Figure 6:
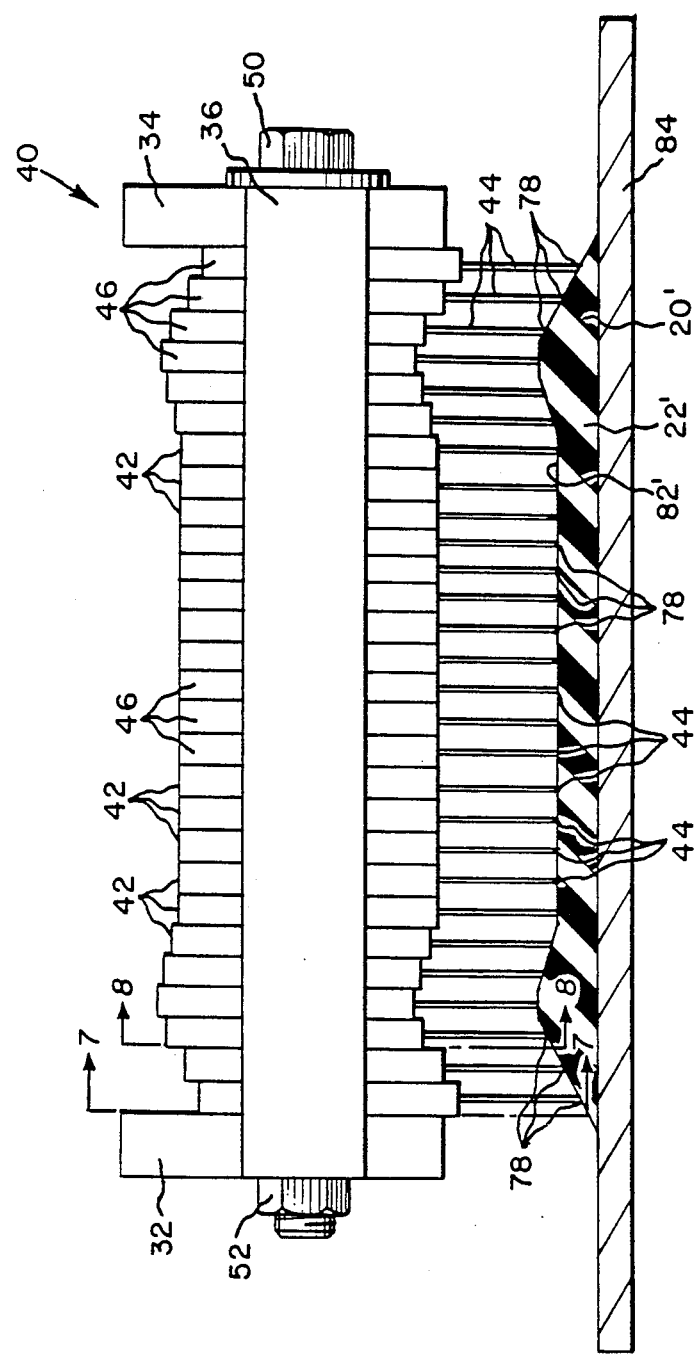
FIG. 6 is a front elevation of the blade cartridge after removal from the stitcher head positioned over a setup table supporting a spliced portino of a treat for adjusting and replacing the blade members.

With the apparatus of this invention, the blade holders 46 can be adjusted and replaced to conform with the profile of the surface 82 and the splice interface line 80 for a particular tread stock 20 by removing the splicing blade member cartridge 40. This is accomplished by first retracting the tread splice stitcher 10 away from the drum 12 by moving the rod 30 with the actuating means (not shown). The retaining plate 56 is then removed by turning the nuts 64 to remove them from the bolts 62 which may then be pulled out of the holes in the retaining plate and side members 58 and 60. Then by removing the screws 54, the splicing blade member cartridge 40 may be pulled away from the side members 58 and 60 and moved to a position over a setup table 84, as shown in FIG. 6, and over a spliced portion 22' of a tread stock 20' in which the surface 82' has the same profile as the tread stock 20 to be spliced. The splice interface line 80', as shown in FIGS. 7 and 8, will also be the same as the splice interface line 80 for the tread stock 20 to be stitched. With the splicing blade member cartridge 40 in the same relative position over the tread stock 20' as it is when mounted on the mounting plate 28, the blade holders 46 are selected so that the splicing blades 44 are in overlapping relationship with the splice interface line 80' as shown in FIGS. 7 and 8. The blade holders 46 may have means for adjusting the position of the splicing blades 44 or the blade holders may be made with the blades at different positions as shown in FIGS. 7 and 8. After the blade holders 46 have been selected for the position of the blades 44 relative to the splice interface line 80', the bolt 50 is inserted through the slots 48 and the blades 44 allowed to rest on the surface 82' of the spliced portion 22' at which time the nut 52 is threaded on the bolt 50 and the holders clamped between the end plates 32 and 34.

The splicing blade member cartridge 40 may then be placed over the side members 58 and 60 and the screws 54 threaded in the end plates 32 and 34 to hold the cartridge on the mounting plate 28. The retaining plate 56 may then be placed over the side members 58 and 60, the bolts 62 inserted and the nuts 64 threaded on the bolts.

In operation, the tread stock 20 is wound on a spool and fed to a conveyor where it is cut to length by a tread skiver. The tread cutter cuts the ends at an angle to the surface 82. The tread stock 20 is then wrapped around the tire casing 14 and the ends spliced at the spliced portion 22 providing the first body or upper layer 24 overlapping the second body or lower layer 26. The drum 12 is rotated to a position under the tread splice stitcher 10 with the splice interface line 80 under the blades 44 so that when the blades contact the surface 82 at least some of the material of the upper layer 24 will be under the blades.

Figure 4:
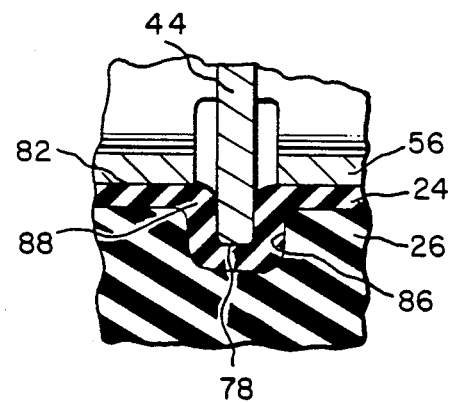
FIG. 4 is a fragmentary enlarged section view taken along the line 4—4 in FIG. 3 but showing one of the blades in the splicing position after forming a slot in the lower overlapped body and displacing a rib of the upper overlapping body into the slot.
Figure 5:
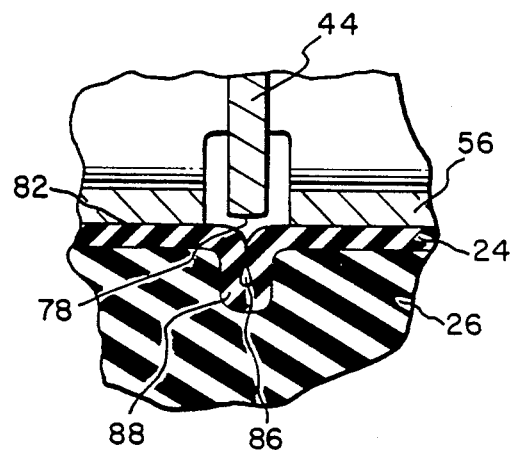
FIG. 5 is a view like FIG. 4 showing the rib in the slot gripped by the resilient material of the lower overlapped body after retraction of the blade.

After the tread splice stitcher 10 is in the splicing position the piston and cylinder assembly moves the rod 30 and the mounting plate 28 toward the drum 12 pressing the edge 78 of each of the blade members 44 in a radial direction against the upper layer 24 to form a slot 86 in the lower layer 26, as shown in FIG. 4, and displace a rib 88 of the upper layer into the slot. The tread splice stitcher 10 is then retracted by moving the rod 30 radially away from the drum 12 which retracts the edge 78 of each of the blade member 42. During the retraction of the blade members 42, the retaining plate 56 is pressed against the surface 82 of the tread stock 20 by the springs 70 so that the ribs 88 remain in the slots 86 and are gripped in the slots by the resilient material of the lower layer 26. As shown in FIGS. 4 and 5, the upper layer 24 is of a deformable material with sufficient strength to withstand the pressure of the edge 78 of the blade 44 without severing the material. As shown in FIGS. 4, 5, 8 and 9 the edge 78 of the blade 44 is curved and has a blunt surface so that the upper layer 24 may be deformed without cutting.

In this process the retaining plate 56 extends along the flat portion 76 of the tread stock surface 82 and it has been found that this is sufficient to hold the upper layer 24 against the lower layer 26 during retraction of the blades 44. It is evident, however, that the retaining plate 56 may be longer and have a configuration conforming to the surface of the raised portions of the surface 82 of the tread stock 20, if desired.

With this apparatus the blades 44 penetrate the lower layer 26 approximately 1/16 to 1/18 in. (0.159 to 0.318 cm.) and a satisfactory mechanical bond is provided without the necessity of using an adhesive.

The blades 44 are spaced about ¼ in. (0.635 cm); however, the spacing may be increased or decreased depending upon the material of the tread stock 20 and the power available for pressing the blades against the tread stock surface 82. It is understood that the length of the blade edge 78 may be less than that shown and the blade edge may be curved at the sides 79 only or completely across the blade, as shown in FIGS. 7 and 8, depending upon the material to be spliced and the power available for penetrating the material of the tread stock 20, displacing the ribs 88 and forming the slots 86. It can be seen that with an elongated edge 78 of the blade 44, the accuracy of alignment of the tread splice stitcher 10 with the splice interface line 80 need not be as precise because only a portion of the edge of the blade need be in pressing engagement with the upper layer 24 to provide the necessary mechanical bond.

While a certain representative embodiment and details have been shown for the purpose of illustrating the invention, it will be apparent to those skilled in the art that various other changes and modifications may be made therein without departing from the scope of the invention.

What is claimed is:

1. Splicing apparatus for attaching an overlapping upper layer of a first body of deformable material and an overlapped lower layer of a second body of resilient material comprising:
    (a) support means for supporting said overlapped lower layer of said second body;
    (b) a splicer mounting member
    (c) blade means including blade members supported at a spaced-apart position from said support means adjacent said overlapping upper layer of said first body, said blade means comprising a blade member cartridge mounted on said splicer mounting member;
    (d) means for moving said blade means toward said support means to press an edge of each of said blade members to deform said upper layer of said first body into said lower layer of said second body to form a slot in said second body and displace a rib of said first body into said slot;
    (e) means for moving said blade means away from said support means to retract each of said blade members from said rib and said slot; and
    (f) means resiliently mounted on said splicer mounting member for holding said upper layer of said first body against said lower layer of said second body on said support means while retracting each of said blade members from said rib and said slot so that said rib is gripped in said slot by said resilient material of said second body.

2. Splicing apparatus in accordance with claim 1 wherein said means for holding said upper layer of said first body against said lower layer of said second body comprises a retainer assembly having a pressing plate with retainer bars positioned between at least some of said blade members, side members extending from said pressing plate to said splicer mounting member and spring means positioned between said side members and said splicer mounting member.

3. Splicing apparatus in accordance with claim 1 wherein said blade members include blade holders for splicing blades adjustably positioned between end plates of said blade member cartridge, clamping means connecting said end plates for urging said end plates into clamping engagement with said blade holders to maintain said blade holders in an adjusted position.

4. Splicing apparatus in accordance with claim 2 wherein said pressing plate is detachably mounted on said side members and said blade member cartridge is detachably mounted on said splicer mounting member whereby upon removal of said pressing plate said blade member cartridge can be removed and the blade holders adjusted or replaced.

5. Splicing apparatus in accordance with claim 3 wherein said clamping means comprises a clamping bolt member.

6. Splicing apparatus in accordance with claim 5 wherein each of said blade holders includes a slot for said bolt member and said slot being located at a predetermined position between the sides of each of said blade holders to position said splicing blades along a splice interface line at a surface of said first body and said second body.

7. Splicing apparatus in accordance with claim 6 wherein each said slot in each of said blade holders has a length at least equal to the distance the blade holder must be lifted or lowered to conform with the profile of said surface at said splice interface line.

8. Splicing apparatus for attaching an overlapping upper layer of a first body of deformable material and an overlapped lower layer of a second body of resilient material comprising:
    (a) support means for supporting said overlapped lower layer of said second body;
    (b) blade means including blade members supported at a spaced-apart position from said support means adjacent said overlapping upper layer of said first body;
    (c) means for moving said blade means toward said support means to press an edge of each of said blade members to deform said upper layer of said first body into said lower layer of said second body to form a slot in said second body and displace a rib of said first body into said slot;
    (d) each of said blade members including a splicing blade having an edge curved at the sides for reducing the forces at the sides and preventing cutting of the material of said first body and said second body;
    (e) means for moving said blade means away from said support means to retract said blade members from said rib and said slot; and
    (f) means for holding said upper layer of said first body against said lower layer of said second body on said support means while retracting said blade members from said rib and said slot so that said rib is gripped in said slot by said resilient material of said second body.

9. Splicing apparatus in accordance with claim 8 wherein said edge of said splicing blade is blunt to prevent cutting of the material of said first body and said second body.

10. Splicing apparatus in accordance with claim 8 wherein said edge of said splicing blade is curved between said sides to provide a curved surface completely across said blade.

* * * * *